UNITED STATES PATENT OFFICE.

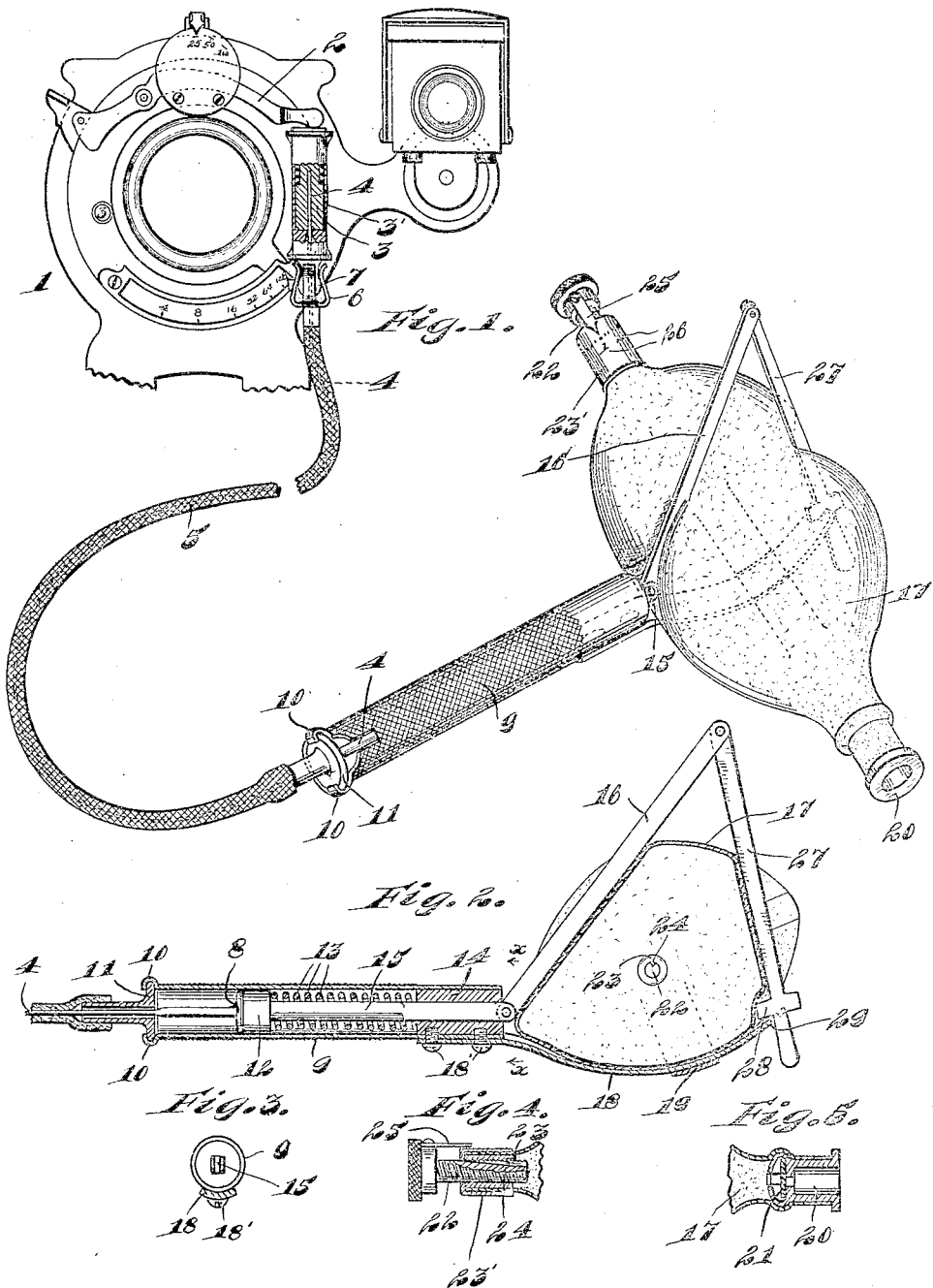

WILLIAM SYKES, OF ROCKFORD, ILLINOIS.

PHOTOGRAPHIC-SHUTTER-TRIPPING MECHANISM.

1,132,229.  Specification of Letters Patent.  Patented Mar. 16, 1915.

Application filed May 20, 1912. Serial No. 698,505.

*To all whom it may concern:*

Be it known that I, WILLIAM SYKES, a citizen of the United States, and a resident of the city of Rockford, county of Winnebago, and State of Illinois, have invented certain new and useful Improvements in Photographic - Shutter - Tripping Mechanism, of which the following is a specification.

My invention relates to photographic shutter tripping mechanism and has for its object the production of mechanism of this character through the medium of which a photographic shutter, such as a camera shutter, may be automatically tripped for operation at the expiration of a pre-determined interval so as to permit of the operator of the camera or photographic device being included in the picture taken.

A further object is the production of shutter tripping mechanism, as mentioned, which will be of simple and economical construction and efficient in operation. Other objects will appear hereinafter.

The invention consists in the combinations and arrangements of parts hereinafter described and claimed.

The invention will be best understood by reference to the accompanying drawing forming a part of this specification, and in which, Figure 1 is a fragmentary front elevation of the portion of a conventional camera containing the camera shutter and the operating mechanism therefor to which is applied the tripping mechanism embodying my invention, the latter being shown in perspective, Fig. 2 is a central longitudinal section of the shutter tripping mechanism, Fig. 3 is a transverse section taken on substantially line x—x of Fig. 2, and Figs. 4 and 5 are sectional details of the opposite end portions of the fluid bag included in the construction, showing the valves coöperating with said bag.

Referring now to the drawing, I have illustrated therein the portion 1 of a conventional camera in which is arranged the shutter mechanism. A pivoted shutter tripping lever is shown at 2, said lever being tilted to effect tripping of the shutter through the medium of the plunger 3 which is mounted for reciprocation in the cylinder 3'. Said plunger 3 is moved upwardly to effect rocking or tilting of the lever 2 through the medium of a flexible wire 4 which projects through the lower end of the cylinder 3' into engagement with said plunger, the arrangement being such that longitudinal movement of said wire effects operative movement of said plunger. The flexible element 4 is slidably mounted in a comparatively firm casing 5 which prevents buckling of said element during operation thereof. The casing 5 is provided at one end with a spring clip 6 which engages an enlarged head or nipple 7 provided at the lower end of the cylinder 3'. The opposite end of member 4 is provided with an exteriorly positioned head 8 adapted for engagement in effecting longitudinal movement of said member 4 in tripping the camera shutter.

The construction thus far described is old and well known, no claim being here made thereto, the mechanism for effecting depression of the head 8 in order to move the member 4 to trip the shutter constituting the present invention, this mechanism being set forth in the following: This mechanism comprises a tube 9 which is open at one end for the reception of the head 8 of the member 4, such end of said tube being provided with engaging fingers 10 adapted to releasably embrace a head 11 provided at the adjacent end of the casing 5 to hold the latter against relative longitudinal movement. Slidably mounted in the tube 9 is a plunger or piston 12 adapted for engagement with the head 8 and so that, when said plunger is moved in the tube 9 toward the head 8, depression of the latter and hence longitudinal movement of the member 4 will be effected. Coöperating with the plunger 12 is a helical compression spring 13 which is interposed between said plunger and a plug 14 secured in the opposite end of the tube 9. The plunger 12 is carried at the inner end of a stem 15, the opposite end of the latter passing slidably through the plug 14 and being pivotally connected at its outer end with a lever 16. The lever 16 is adapted, when in inclined position, as shown in Figs. 1 and 2, to engage against the plug 14 and thus serve to hold the stem 15 and hence the plunger 12 in operative position against the influence of the spring 13, the arrangement being such that, when said lever is rocked into alinement with the stem 15, the latter will be released so as to permit of the plunger 12 being moved by the spring 13 to actuate the member 4.

The lever 16 is releasably held in inclined or operative position through the medium of a collapsible fluid bag 17 preferably of rubber, said bag being mounted upon a supporting arm 18 which is fastened to one end of the tube 9 by screws 18′, said screws serving also as a means of securing the plug 14 in position, a loop 19 engaging under the arm 18 affording means for securely fastening said bag upon said arm. The arrangement is such, as will be observed, that, when said bag is distended, the same will hold the lever 16 in operative position, collapse of said bag by reason of the exhaust of fluid therefrom, permitting of said lever rocking toward releasing position. This being so it will be seen that, in the operation of the device, the duration of the interval at the expiration of which the lever 16 will be released will depend upon the rapidity of exhaust of the fluid from the bag 17. One end of said bag 17 is provided with a mouth piece 20 for inflating the same, a disk valve 21 being provided at the inner end of said mouth piece which permits of admission of fluid to said bag, but preventing exhaust therefrom. At the opposite end of said bag is provided a valve for controlling the exhaust. This valve comprises a screw 22 which is threaded into a socket or nipple 23 secured in said end of said bag, the bag being fastened to said nipple through the medium of a ferrule or cap 23′. The screw 22 is provided in one side with a longitudinally extending tapering groove 24, which in use constitutes a fluid exhaust passage, the arrangement being such that the rapidity of exhaust will be governed by the relative longitudinal position of the screw in the nipple 23, it being clear that the size of the exhaust aperture formed at the end of the member 23′ by the groove 24 will depend upon the relative longitudinal position of the screw 22. A hand or indicator 25 is provided upon the head of screw 22 for coöperation with graduations 26 provided upon the outer surface of the member 23′ for use in adjusting said screw to secure any desired duration of exhaust or collapse of the bag 17.

In operating the device the stem 15 of the plunger 12 is first drawn back against the influence of spring 13 and held in this position through the inclination of the lever 16, the latter being temporarily locked in inclined position through a link 27 pivotally connected to the outer end thereof, an ear 28 provided at the free end of the link 27 being adapted to engage the outer end of member 18 to hold the lever 16 in inclined position, a notch 29 provided at the outer end of the member 18 being adapted to receive the link 27 for properly positioning the same. The head 8 of the shutter tripping mechanism 4 is then inserted into the outer end of the tube 9, said end of said tube being cut away at one side in order to permit of ready insertion of the former, the end piece 11 in the same operation, being engaged with the retaining fingers 10 of the tube 9. The bag 17 is then inflated by blowing in the mouth piece 20. The valve screw 22 is then adjusted so as to regulate the rapidity of the exhaust and hence the time required for the bag to collapse whereupon the link 27 is released permitting of the lever 16 bearing directly against the bag. Said bag will hold the lever 16 in inclined position, permitting of the same to be rocked toward releasing position as said bag collapses. When the bag is entirely collapsed and hence said lever positioned in alinement with the stem 15, the latter will be released and the plunger 12 moved by the spring 13 causing the tripping of the camera shutter. By reason of the adjustability of the exhaust valve, it is clear that the exhaust of the fluid from the bag 17 may be regulated so as to effect the automatic tripping of the shutter after the expiration of any predetermined interval so as to permit of the operator being included in the picture if he so desires.

The device is simple and economical of construction and is positive and quick acting in its operation.

While I have illustrated and described the preferred form of construction for carrying my invention into effect, this is capable of variation and modification without departing from the spirit of the invention. I, therefore, do not wish to be limited to the precise details of construction set forth, but desire to avail myself of such variations and modifications as come within the scope of the appended claims.

Having described my invention what I claim as new and desire to secure by Letters Patent is:

1. A photographic shutter trip comprising in combination a member adapted to trip the shutter; a slidable plunger adapted when released to operate said member; a pivoted detent connected with said plunger and adapted when in inclined position to hold the latter against motion; and pneumatic means for releasably holding said detent in inclined position, substantially as described.

2. A photographic shutter trip comprising in combination with a depressible member adapted when depressed to trip the shutter, a tube; a plunger slidably mounted in said tube adapted when released from operative position to operate said depressible member; a pivoted detent connected with said plunger and adapted when in inclined position to hold the latter in operative position; and pneumatic means for releasably holding said detent in inclined position, substantially as described.

3. A photographic shutter trip comprising in combination with a depressible member adapted when depressed to trip the shutter, a tube; a plunger slidably mounted in said tube adapted when released from operative position to operate said depressible member; a pivoted detent connected with said plunger and adapted when in inclined position to hold the latter in operative position; a collapsible bag adapted when distended to releasably hold said detent in inclined position, collapse of said bag permitting of rocking of said detent to releasing position; and means for controlling the exhaust of fluid from said bag, substantially as described.

4. A photographic shutter trip comprising in combination with a depressible member adapted when released to trip the shutter, a tube; a plunger slidably mounted in said tube adapted when released from operative position to operate said depressible member; a lever pivotally connected with said plunger and adapted when in inclined position to hold the latter in operative position; a collapsible fluid bag mounted at one end of said tube and adapted when distended to releasably hold said lever in inclined position; collapse of said bag permitting of rocking of said lever to releasing position; and means for controlling the exhaust of fluid from said bag, substantially as described.

5. A photographic shutter trip comprising in combination with a depressible member adapted when depressed to trip the shutter, and an elongated member adapted when moved longitudinally to operate said depressible member, said elongated member having a head adapted to be engaged for moving said member, a tube into one end of which said head is adapted to be inserted, a spring pressed plunger slidably mounted in said tube adapted when released from operative position to engage said head and move said elongated member longitudinally; a pivoted detent connected with said plunger and adapted when in inclined position to hold the latter in operative position; collapsible pneumatic means for releasably holding said detent in inclined position, collapse of said pneumatic means permitting of rocking of said detent to releasing position; and adjustable means for controlling the collapse of said pneumatic means, substantially as described.

In testimony whereof I have signed my name to this specification in the presence of two subscribing witnesses.

WILLIAM SYKES.

Witnesses:
R. R. WALSH,
GEORGE P. GALLAHER.

Copies of this patent may be obtained for five cents each, by addressing the "Commissioner of Patents, Washington, D. C."